Aug. 17, 1965  F. CURTIS  3,200,559
FRUIT HANDLING MACHINE
Filed July 13, 1961  6 Sheets-Sheet 1
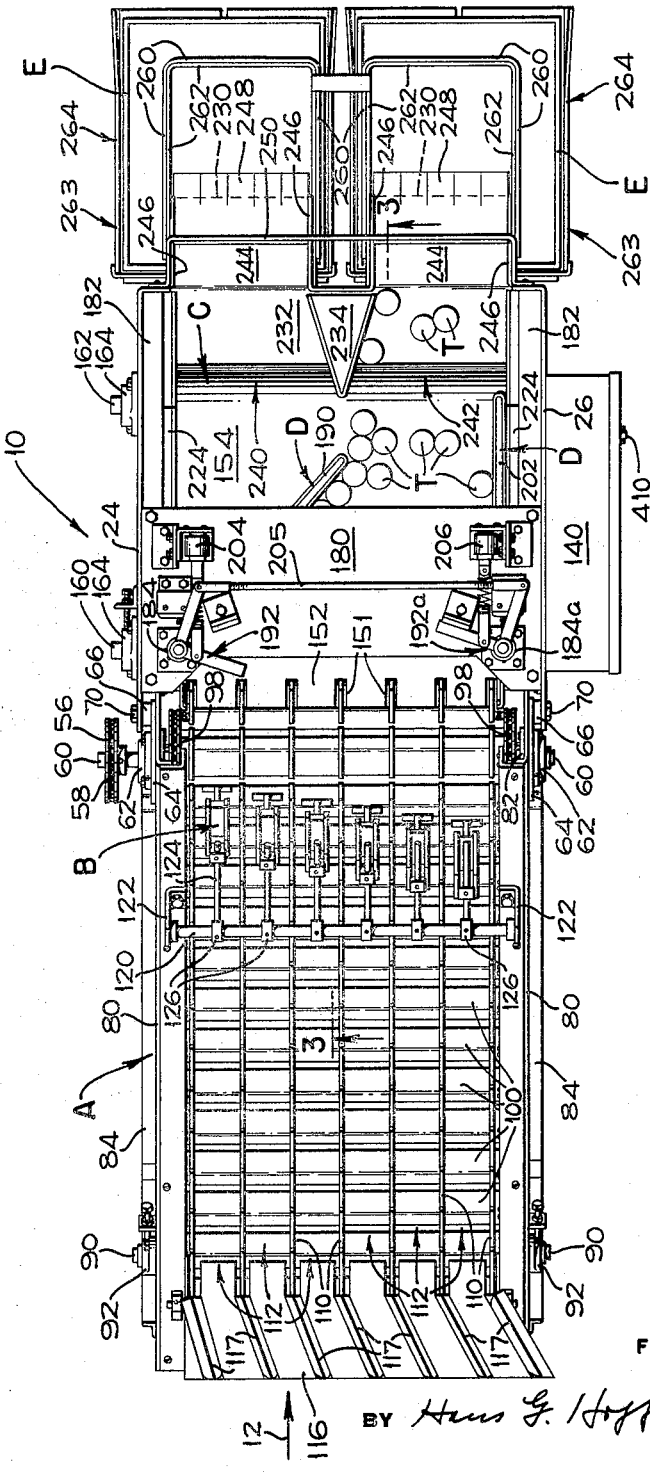
INVENTOR
FRANCIS CURTIS
BY Hans G. Hoffmeister
ATTORNEY

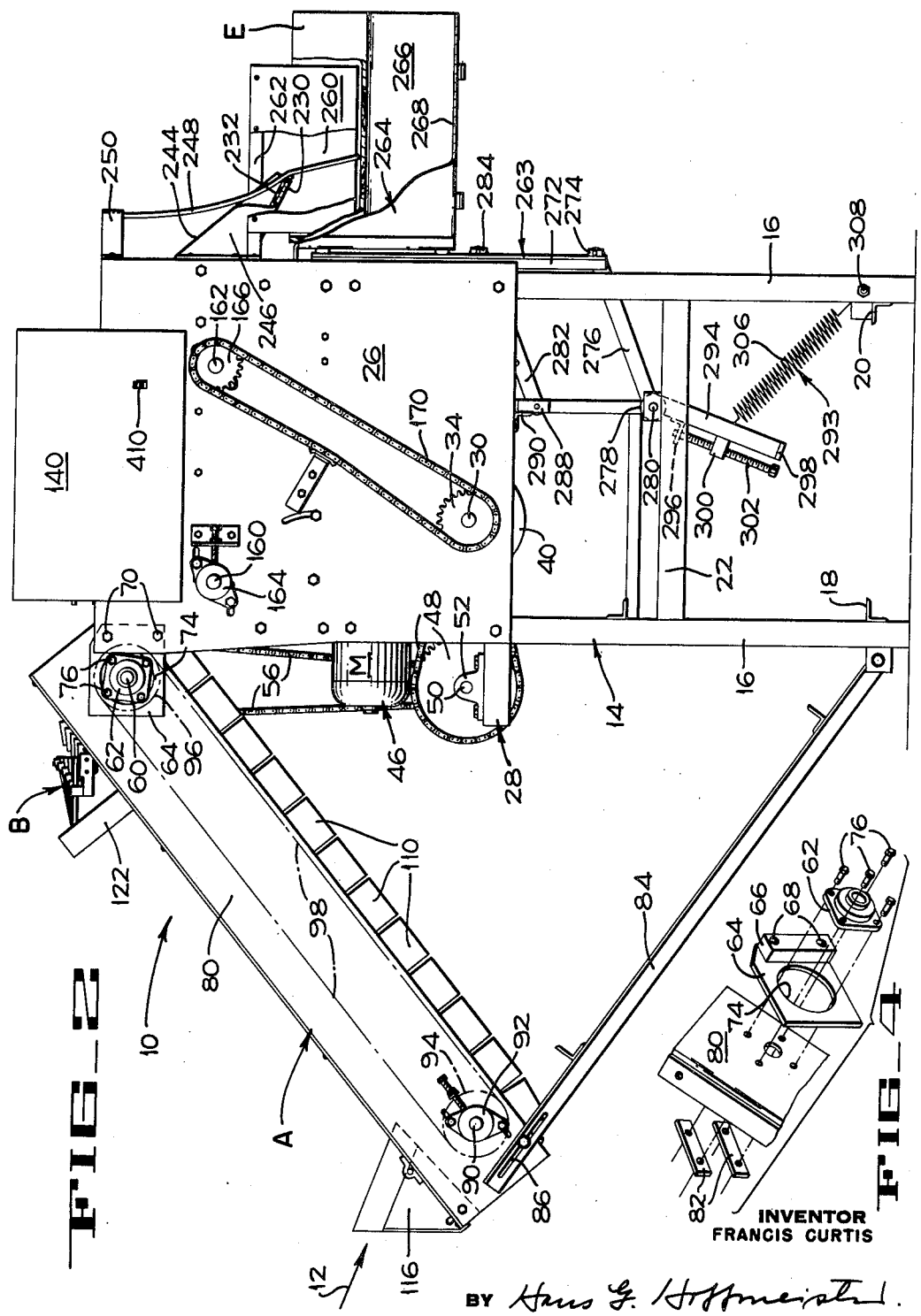

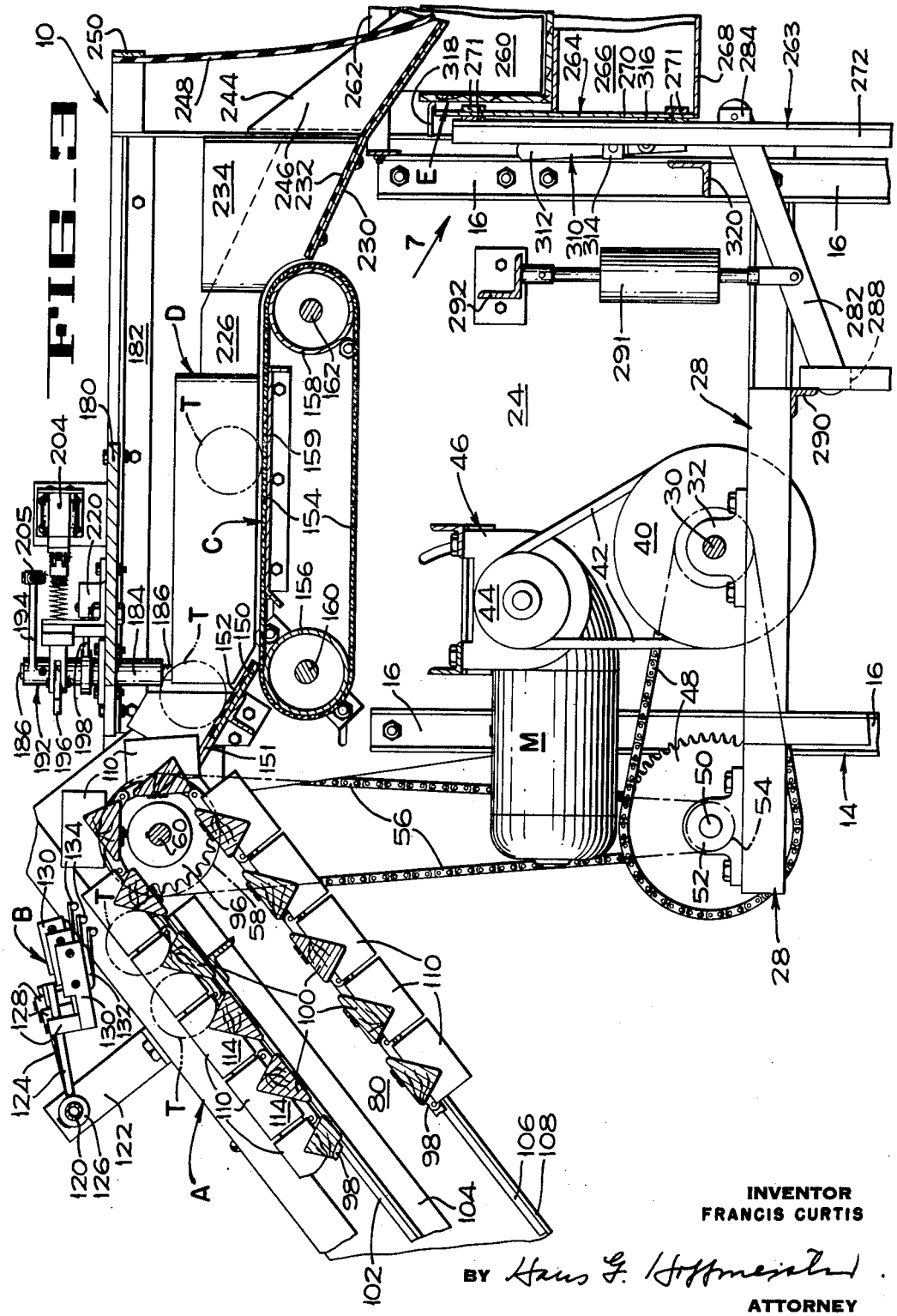

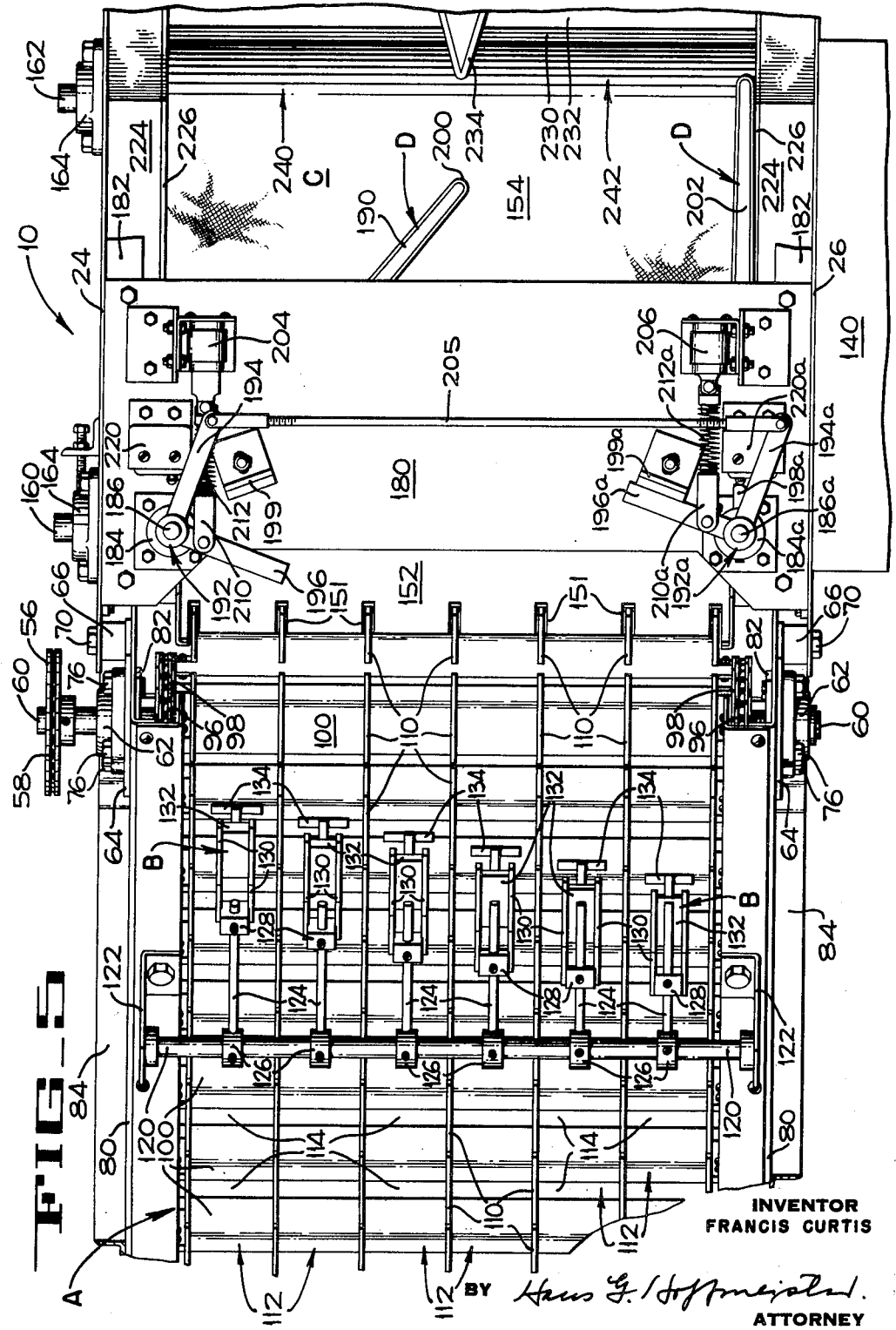

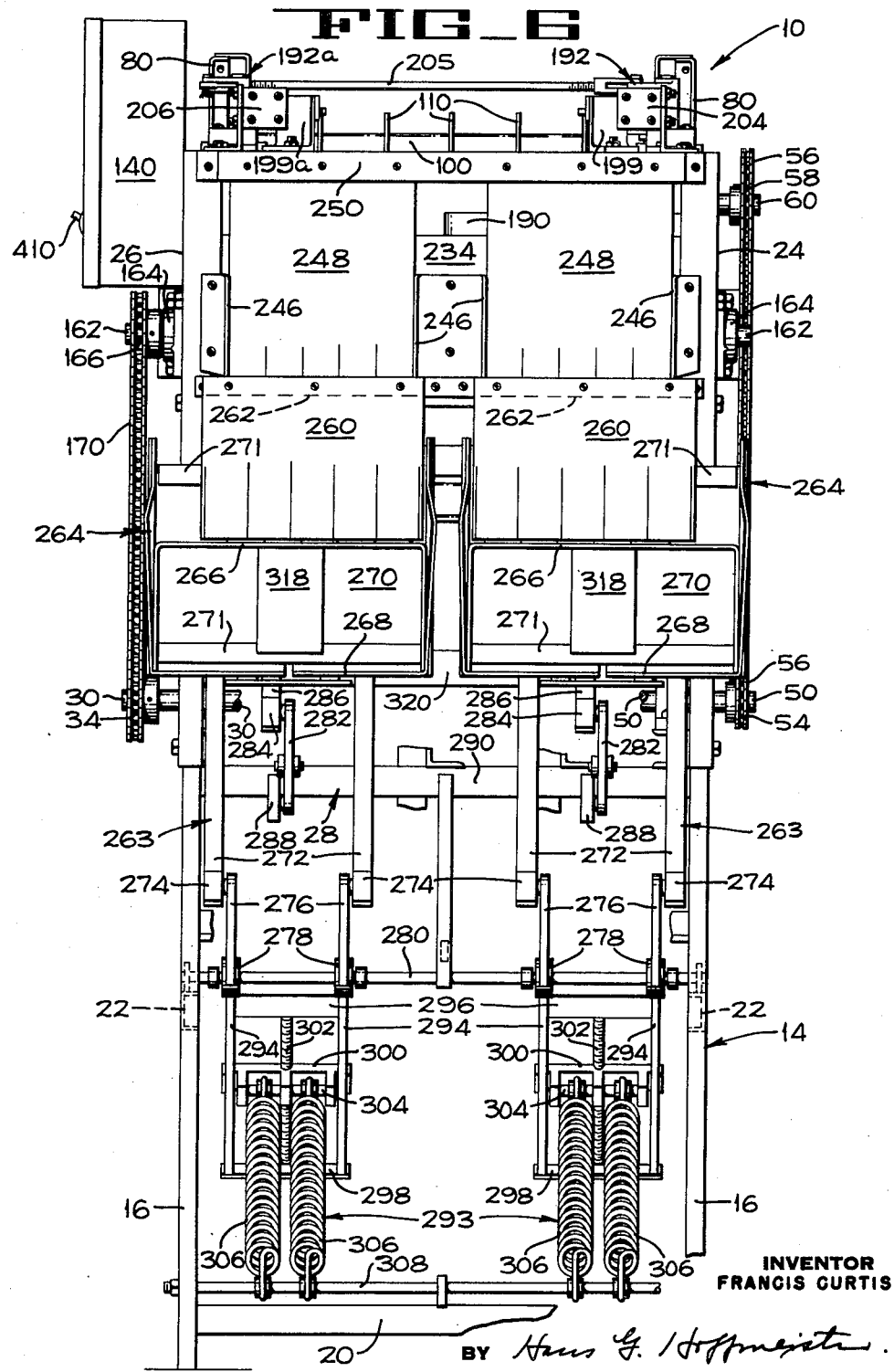

Aug. 17, 1965  F. CURTIS  3,200,559
FRUIT HANDLING MACHINE
Filed July 13, 1961  6 Sheets-Sheet 6
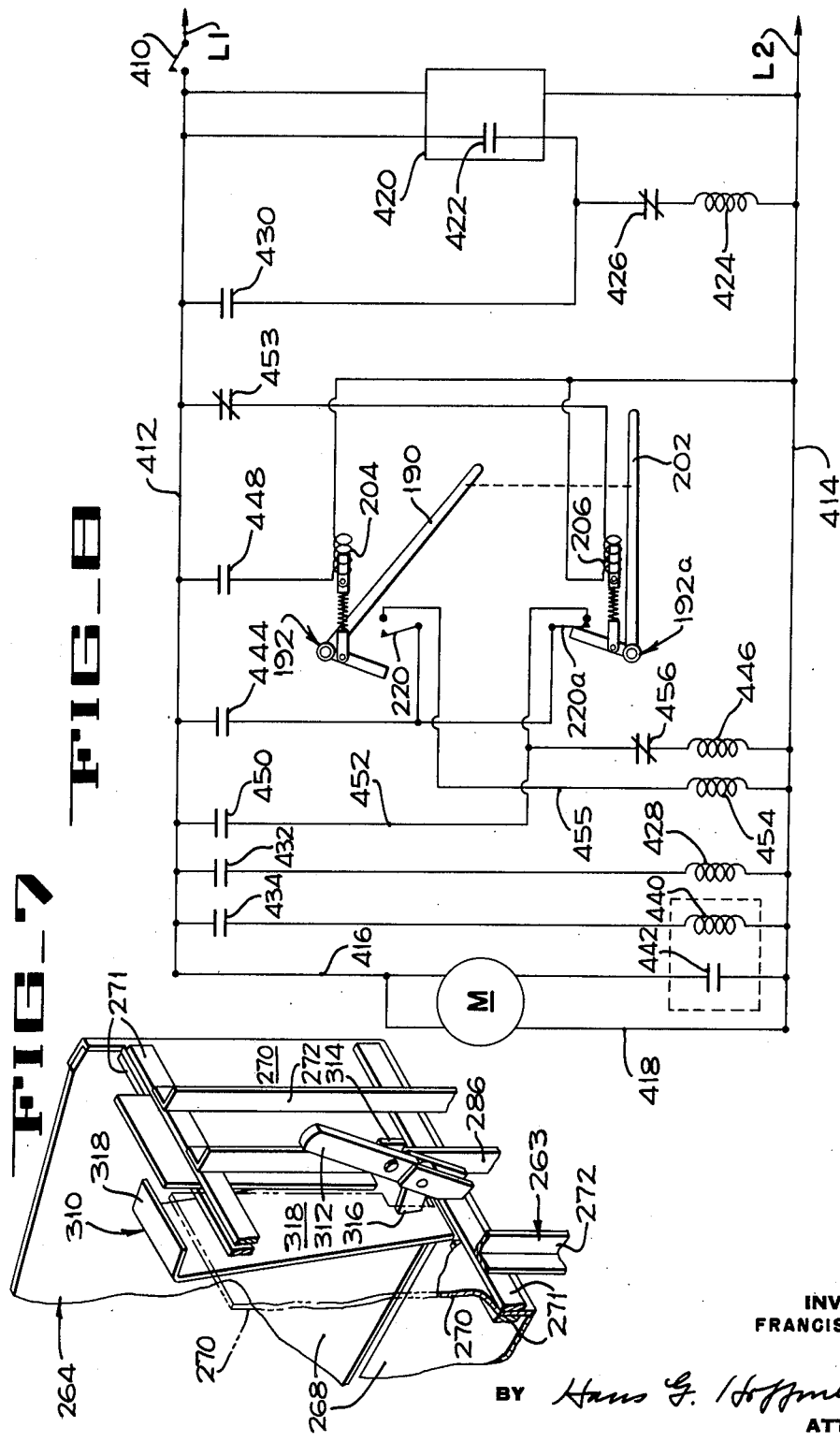
INVENTOR
FRANCIS CURTIS
BY Hans G. Hoffmeister
ATTORNEY United States Patent Office 3,200,559
Patented Aug. 17, 1965

3,200,559
FRUIT HANDLING MACHINE
Francis Curtis, Riverside, Calif., assignor to FMC Corporation, San Jose, Calif., a corporation of Delaware
Filed July 13, 1961, Ser. No. 123,844
12 Claims. (Cl. 53—78)

The present invention pertains to fruit handling machines, and more particularly to machines for counting a predetermined number of fruit, such as tomatoes, and packing them into a container.

Counting and packing machines are widely used in the fruit packing industry, but many of these machines are unsuitable for handling relatively fragile fruit, such as tomatoes or peaches, which are liable to split or be bruised.

Another disadvantage of the present packing machines is that none combine the features of delicate handling, to protect the fruit, with a rapid and continuous counting and packing operation to produce an output of counted fruit as high as the processing speed which other associate operations can be performed. In other words, the present counting and packing machines slow down the overall packing house operations.

It is therefore an object of the present invention to provide a packing machine in which fruit is automatically conveyed, counted and inserted into manually positioned boxes in a continuous and rapid filling operation.

Another object of the present invention is to provide an improved counting and packing machine for handling fragile fruit.

Another object of the present invention is to provide an automatic fruit packing machine which accurately counts and packs a predetermined number of fruit.

A further object is to provide a fruit packing machine having an improved two-speed fruit conveyor drive train whereby the speed changes of the conveyor are accomplished smoothly and without jarring or abrading the fruit.

Other objects and advantages of the present invention will become apparent from the following description, and from the accompanying drawings, wherein:

FIGURE 1 is a plan of the fruit packing machine of the present invention.

FIGURE 2 is a side elevation, with parts broken away, of the fruit packing machine illustrated in FIGURE 1.

FIGURE 3 is an enlarged fragmentary vertical section taken on lines 3—3 of FIGURE 1, and particularly illustrating details of the conveying, counting and distributing means controlling the fruit.

FIGURE 4 is an exploded isometric illustrating the pivotal mounting of one side of the feed conveyor.

FIGURE 5 is a top plan, partly broken away, of that part of the machine shown in FIGURE 3.

FIGURE 6 is an elevation, partly broken away, of the discharge end of the packing machine.

FIGURE 7 is a fragmentary perspective illustrating one of two container support mechanisms and is taken looking in the general direction of the arrow 7 on FIGURE 3.

FIGURE 8 is a schematic electrical diagram illustrating the automatic control circuit governing operation of the packing machine.

In a typical operational sequence, the fruit counting and packing machine 10 (FIG. 1) of the present invention receives tomatoes discharged from a feed conveyor, not shown, and moves the tomatoes in the direction of arrow 12 onto a two-speed elevator conveyor A which advances the fruit under a bank of counting switches B. The switches B register a separate counting impulse for each fruit and, after they are counted, the tomatoes are discharged onto a horizontal transfer conveyor C.

A diverter mechanism D channels all of the fruit in one counted batch into one of two lug box receptacles E which have been manually positioned on the discharge end of the machine. When one box E has been filled, it is removed and is replaced by an empty box, while the diverter mechanism D has meantime channelled the next counted batch of tomatoes into the other box. The counting and discharge cycle is thus continuous as long as fruit and boxes are fed to the packing machine 10.

The fruit packing machine 10 (FIGS. 2 and 3) includes a welded frame structure 14 having supporting legs 16 that are interconnected near their lower ends by transverse angle members 18 and 20. The two legs 16 at each side of the machine are interconnected, intermediate their length, by longitudinally extending angle braces 22. The upper end portions of each longitudinal pair of the legs 16 are bolted to the inner surfaces of side panels 24 and 26, respectively, which serve to enclose and support several of the machine components to be described.

A drive assembly support platform 28 (FIGS. 2 and 3) is mounted between the lower ends of the side panels 24 and 26, and is secured to the frame legs 16 at each side of the machine. The platform 28 supports a transversely extending driveshaft 30 which is rotatable in spaced bearings 32, only one being shown, that are bolted to the platform 28. As seen in FIG. 2, one end of the driveshaft 30 extends through the side panel 26 and a sprocket 34 is secured to this end portion for driving the transfer conveyor C. A pulley 40 (FIG. 3) is secured to the driveshaft 30 between the side panels 24 and 26, and is driven by means of a V-belt 42 that is trained over a pulley 44 of a motor and transmission unit 46. The unit 46 includes a two-speed electric motor M which rotates the driveshaft 30 continuously during operation of the fruit packing machine 10.

A chain and sprocket drive train 48 connects driveshaft 30 to a countershaft 50 that is supported by transversely spaced bearings 52 which are bolted to the platform 28. The drive train 48 is so designed that the countershaft 50 will be rotated at a slower speed than the driveshaft 30.

The countershaft 50 (FIGS. 3 and 6) drives the elevating conveyor A by means including a sprocket 54 (indicated by a pitch line in FIG. 3) which is fixed to the countershaft, and a roller chain 56 which is trained around sprocket 54 and around a sprocket 58 that is secured to the driven shaft 60 of the elevating conveyor A. The shaft 60 (FIGS. 1 and 4) is rotatable in two spaced bearings 62, each bearing being mounted against the outer surface of a support plate 64 which is provided with an integral block 66 having a pair of threaded apertures 68. Each block 66 abuts the inner surface of one of the side panels 24 or 26 and is secured thereto by bolts 70 (FIG. 2) which extend through openings in the panels and engage the threaded apertures 68.

A large circular aperture 74 (FIG. 4) is formed in each support plate 64, the diameter of the aperture being such that the inner edge surface of the aperture contacts the outer surfaces of the shanks of a circular array of bolts 76 which extend through the bearing 62, the aperture 74, and a side wall 80 of the elevator conveyor A. The inner ends of the bolts 76 are threaded into apertured retaining plates 82. It will be seen that with the described mounting, the elevator conveyor A (FIGURE 2) may be readily pivoted on the four bolts 76 around the axis of the driven elevator shaft 60 so as to adjust the elevation of the lower, intake end of the elevator. The adjusted angle of elevator inclination is maintained by means of two angle bar struts 84 (FIGS. 1 and 2) each of which is bolted to one of the support legs 16 and is adjustably bolted to the associated conveyor side walls 80 by a bolt extending through a slotted aperture 86.

An idler shaft 90 (FIGS. 1 and 2) is journalled in bearings 92 that are adjustably bolted to the lower portions of the elevator conveyor side walls 80. A pair of lower spaced sprockets 94 (indicated by a pitch line in FIG. 2) are mounted on the idler shaft 90 in alignment with an upper pair of sprockets 96 (FIG. 5) that are secured to the elevator driveshaft 60. An endless roller chain 98 is trained around each aligned upper and lower pair of elevator sprockets, and an endless spaced series of transverse conveyor flights 100 are fastened at each side of the machine to the chains 98.

The upper flight of each chain 98 is supported by a chain guide 102 (FIG. 3) which is secured to an angle member 104 that is fixed to the side wall 80, and a similar chain guide 106 supports the lower chain flight and is secured atop an inwardly turned flange 108 of the side wall 80. The sights 100 are triangular in cross section and each flight has seven equi-spaced notches in one of its surfaces, each notch extending longitudinally of the conveyor, and the notches of one flight being aligned with the notches of the two adjacent flights.

A resilient rectangular blade 110 is secured in each notch whereby the upper conveying surface of the elevator is divided into six parallel conveying lanes 112 (FIG. 5) having pockets 114 formed with sloping leading and trailing walls formed by the flights 100 and having vertical side walls formed by the blades 110. At the lower end of the elevator A, an inclined guide panel 116 (FIG. 1) having barrier walls 117 that channel the fruit into single file lanes, is adjustably secured atop the side panels 80 for guiding fruit into the lanes 112 of the elevator. The guide panel 116 is not essential to the invention, however, and may be replaced by many known feed devices such as chutes, hoppers or driven belts.

The bank of counting switches B (FIGS. 3 and 5) includes a tubular support member 120 which extends across elevator A and is secured thereto by angle brackets 122 that are bolted to the side panels 80. A switch support rod 124 is mounted on the tube 120 over each conveying lane 112 by means of a set collar 126 secured to the rod and locked on the tube. A rectangular set collar 128 is adjustably secured to each rod 124, and each set collar 128 is provided with rearwardly extending side plates 130 which embrace a single-pole electrical switch 132. Depending from the bottom of each switch 132 is a T-shaped actuating arm 134, the distal end of which lies in the path of fruit T being advanced in the lanes 112 of the elevating conveyor.

The switches 132 are disposed in longitudinally staggered arrangement and are spaced from each other in the direction of fruit travel a ditsance equal to one-sixth the longitudinal distance between the centers of the pockets 114. In this way the electrical counting impulses from the switches will not occur simultaneously and will not interfere with one another. The previously mentioned counter, and other control apparatus are mounted in a box 140 which is secured to the side panel 26.

A downwardly inclined support plate assembly 150 (FIGS. 3 and 5) extends across the upper end of the elevator A between the side panels 24 and 26 to which it is bolted. The upper leading end of the support plate 150 is serrated, as shown at 151 (FIG. 5), to provide clearance space for the vertical pocket walls 110 as they pass to the underside of the elevator conveyor, and the upper surface of the plate 150 has a resilient, coexistensive mat 152 secured thereto so as to cushion the fall of the fruit dropped from the fruit pockets 114.

The lower end of the plate 150 is closely spaced from the upper surface of the transfer conveyor C which is formed of an endless fabric belt 154 that is trained around an idler drum 156, a driven drum 158, and over a plate 159 which supports the upper flight. The drums 156 and 158 are mounted upon rotatable shafts 160 and 162, respectively, which are provided with outboard bearings 164 (FIGS. 1 and 2) that are bolted to the side panels 24 and 26. A sprocket 166 is secured to the drum shaft 162, the sprocket 166 being driven from the sprocket 34 on the driveshaft 30 by means of a connecting roller chain 170.

It will be noted that the drum 158 of transfer conveyor C is driven at about the same speed as the driveshaft 30, and that the speed reduction effected by the described drive train of the elevator A will advance the elevator pockets 114 at a much slower linear speed than the linear speed of the transfer conveyor C. The purpose of this speed difference is to cause the removal of fruit from the discharge end of the elevator A at a faster rate than it is delivered to the transfer conveyor C so that fruit will not accumulate upon the belt 154 and impede the discharge of succeeding fruit from elevator A.

The fruit diverting mechanism D (FIGS. 3 and 5) is mounted on a transversely extending panel 180 which is secured at each end to an angle bar 182 that is bolted to one of the side walls 24, 26 and overlies the initial portion of the transfer conveyor C. Near one end of the panel 180, a bearing 184 (FIG. 5) that is secured to the panel carries a rotatable vertical shaft 186 which projects in both directions from the bearing. The lower end of the shaft 186 is secured to a diverter blade 190. The upper end of the shaft 186 extends through the hub of a bell crank 192 which is keyed or otherwise secured to the shaft, and which is provided with an upper arm 194 and a lower arm 196.

Interposed between the bell crank 192 (FIGS. 3 and 5) and the bearing 184, and locked on the shaft 186 in an adjustable angular position, is an elongate switch arm 198 that is aligned with the diverter blade 190. The diverter blade 190 is movable, from a position where its free end 200 lies approximately on the longitudinal centerline of the machine to a straight forward position in order to channel all fruit carried upon the transfer conveyor C to one side of the center of the belt 154. In order to accomplish the selective channeling of the fruit toward either side of the belt 154, the diverter blade 190 is ganged to an oppositely disposed diverter blade 202 having actuating and supporting mechanisms constructed in mirror image to the parts already described, these mechanisms being identified by the same reference numerals with the suffix $a$.

The diverter blade 202 is connected to the diverter blade 190 by a tie rod 205 which interconnects the crank arms 194 and 194a, and the blade is positioned upon the shaft 186a in the opposite angular position relative to the blade 190. Swinging movement of the diverter blades 190 and 202 thus directs fruit on the belt 154 to one side or the other of the longitudinal centerline of the machine 10.

Control of the inward movement of the diverter blade 190 is effected by a stop member 199 which is adjustably bolted to the panel 180 and is contacted by the bell crank arm 196. Similarly, a stop member 199a which is contacted by the bell crank arm 196a when the diverter blade 202 is at its outer limit of travel controls the inward position of the diverter blade 202.

Movement of the diverter blades 190 and 202 is effected by a solenoid 204 or a solenoid 206, both of which are mounted upon the panel 180 adjacent one of the bell cranks 192 or 192a. The solenoid 204 (FIGS. 3 and 5) is connected to the crank arm 196 by a link 210 which is pivoted to the crank arm and to the armature of the solenoid. The link 210 includes a spring 212 which provides a degree of resiliency to the link. Accordingly, when the opposite solenoid 206 is energized to exert a pull on the associated link 210a and, by means of the tie rod 205, move the diverter blade 190 to its inner position, the spring 212a damps the movement of the blade so that the blade exerts a gentle, continuous pushing action against the fruit in order to prevent their being damaged. In like manner, energization of the solenoid 204 swings the diverter blade 202 to its inner position and the spring 212 functions in the same manner as the spring 212a.

During operation of the machine the solenoids 204 and 206 are alternately energized by control means including single pole electrical switches 220 and 220a which are mounted on the panel 180 in positions whereby they will be actuated by the switch arms 198 and 198a, respectively. As will be made clear in the description of the electrical controls and the operation of the machine, when either diverter blade is in its outermost position, it closes the contacts of its associated switch and thereby conditions the control circuit for the actuation of the opposite diverter blade in the next operational sequence.

Lateral retaining walls for fruit advanced on the belt 154 (FIGS. 3 and 5) downstream of the diverter blades 190 and 202 are provided by elongate blocks 224, one block being secured to each side panel 24 and 26, and having a coextensive soft rubber facing 226. The downstream end of both blocks and their rubber facings (FIG. 3) are shaped as shown for the block and facing at the left side of the machine.

Downstream of the upper flight of the belt 154, the blocks 224 incline downwardly and form end walls of a sloping discharge ramp 230 which has a soft rubber mat 232 that is secured to its upper surface end, as shown in FIGURE 1, extends rearwardly beyond the end of the side panels 24 and 26. A rubber covered guide block 234 having side walls symmetrically diverging in the direction of fruit advance is mounted upon the central portion of the discharge ramp 230 for the purpose of guiding the friut into either a lane 240 or a lane 242 at opposite sides of the discharge ramp. Each lane is aligned with one of the lug boxes E.

Rearwardly of the guide block 234 (FIGS. 1 and 2) the discharge ramp 230 is divided into two separate guide chutes 244 which have upstanding side walls 246, each of which terminates inside an empty lug box E. Fruit rolling off the end of the ramp portions 230 of the guide chutes 244 are impeded in their forward movement by a rubber flap 248 that extends down over the discharge end of each chute from a support bracket 250. The lower end portions of the flaps 248 are slotted so as to provide a series of individual rubber fingers which separately retard fruit rolling into the boxes E. The discharged fruit are at the same time confined in horizontal directions, to prevent them from excessive rolling which may damage them, by flexible rubber walls 260 (FIGS. 1 and 2). The walls 260 depend from U-shaped support brackets 262 that are mounted on the ends of the side panels 24 and 26, and their lower ends are adjacent the bottoms of the boxes E.

Each box E is supported by vertically movable counterbalanced support means 263 (FIG. 2) including a box carrier 264 which is in the general form of an open-top box having an open, rearwardly facing end whereby the operator may place and remove the boxes E through the open end of each carrier. The box is supported upon and inverted removable U-shaped sheet metal box support member 266 which is disposed inside carrier 264 and rests upon a floor 268 of the carrier 264. The box support may be removed in order to use boxes of greater depth.

Each carrier 264 has a vertical rear wall 270 consisting of two members (FIGS. 2, 6 and 7), secured together by brace bars 271. The carrier is supported by two angle bars 272 that are secured to and extend downwardly from the wall 270. Each angle bar 272 is provided with a pivot block 274 which is pivotally connected to a link arm 276. The two link arms 276 form part of a spring-biased parallelogram support linkage for the box carriers. The other end portion of each link arm 276 extends toward the feed end of the machine and is fixed to a collar 278 that is rotatable upon a transverse shaft 280 which is fixed at each end to the frame braces 22. The remaining linkage completing the parallelogram support means for each box carrier includes a link 282 which is parallel to the links 276 and is pivoted to a block 284 that is secured to the lower end portion of a bar 286 which depends vertically from near the central part of the box carrier wall 270. The other end of the link 282 is pivoted to a block 288 which is secured to a fixed frame member 290.

Intermediate its ends, the link 282 of each box carrier 263 is pivotally connected to the piston rod of a dashpot unit 291 (FIG. 3), only one being shown, that is pivotally secured to an overhead transverse brace member 292. The dash pots 291 damp the movement of the spring biased box carriers 264 in order to prevent their bouncing up and down when fruit is discharged into the boxes E.

The box carriers 264 are thus mounted for vertical movement from the uppermost position shown in FIGURE 2 to a lowered position due to the weight of fruit discharged into boxes on the carriers and overcoming the force of a spring counterbalancing means 293 which is connected to each carrier mounting. The purpose of the counterbalances is to maintain the boxes in the highest possible positions as they are filled so that the discharged fruit is not subject to long drops into the boxes that might bruise or rupture the fruit.

Each counterbalance connection to the carrier mounting linkage is by means of two bars 294 (FIGS. 2 and 6), each of which is secured to the under surface of one of the collars 278. The two bars 294 of each counterbalance are interconnected by an angle bar 296 near the collars 278, and by a strap 298 across their lower ends. Intermediate the bar 296 and the strap 298, a spring yoke 300 is disposed for sliding movement along the upper surfaces of the bars 294.

A rotatable bolt 302 (FIG. 2) is axially secured to the angle bar 296 and is threaded through an aperture in the center portion of the yoke 300 whereby the yoke may be locked in a selected position along the bars 294. The yoke 300 carries a rod 304 (FIG. 6) on which are mounted the upper eyes of a pair of tension springs 306. The lower ends of the springs are mounted on a shaft 308 which is securel to the legs 16 supporting the the discharge end of the machine.

When a box E has been filled, and the box and its carrier 264 is moved to its lowermost position, a stop mechanism 310 (FIGS. 3 and 7) retains the carrier in the lowermost position after the filled box is removed. In this way the carrier 264 is easily accessible to the operator for replacing the filled box with an empty one. When an emtpy box is placed in position, the stop mechanism 310 is actuated by the empty box to free the carriage so that the springs 306 automatically elevate the box to filling position. The dash pots 291 damp the upward movement of the carirers so that the empty boxes remain properly seated in the carriers and are not bounced out of position.

The stop mechanism 310 includes a vertical latch bar 312 which is pivoted to a block 314 that is secured to the downwardly projecting bar 286 on the box carrier wall 270. The lower portion of the latch bar 312 is pivoted to an arm 316 that extends through the carrier wall 270 and is secured to a presser plate 318 which is disposed in upright position adjacent the inner surface of the box carrier wall 270. When a box E is seated in the carrier 264, the presser plate 318 is moved by the box to a generally vertical position causing latch bar 12 to be swung to an upright position. When a full box E is seated in the carrier, the upper end of bar 312 is at an elevation below the underside of a stop member 320 which is welded to the adjacent legs 16.

When the operator slides the filled box out of carrier 264, the presser plate 318 overbalances and swings the link 312 clockwise (FIG. 7) whereby the upper end of the link 312 is moved to a position beneath the stop member 320 (FIG. 3). Removal of the box E from the carrier thus permits the carrier to rise until the link end strikes the stop member. The carrier is therefore stopped in its lowered position and is easily accessible to the operator for placing an empty box in the carrier. As the empty box is seated, the latch bar 312 is swung to its unlatched position, and the box rises to the filling position with the box carrier.

To initiate operation of the fruit packing machine 10 (FIGS. 1 and 8), an operator places an empty lug box E into each of the box carriers 264 and actuates a toggle switch 410 that is mounted on the control box 140. This energizes lines 412 and 414 from input lines L1 and L2, and the motor M is immediately energized for its high speed range through lines 416 and 418 which are connected to lines 412 and 414, respectively.

The elevator conveyor A is thus actuated and tomatoes T, that are rolling down the guide panel 116 into the pockets 114 of the elevator conveyor A, are rapidly elevated and moved under the bank of counting switches B. As each tomato passes under the counting switch associated with that lane, the switch actuator 134 is lifted by the tomato and an electrical impulse is conveyed to an electrical impulse counter 420. Since the counting switches are staggered in the direction of fruit movement, the separate impulses effected by the actuation of the counting switches are also separated, thus enabling the counter to accurately operate at a rapid rate.

After being counted, the fruit are discharged from the upper end of the elevator conveyor A onto the soft rubber mat 152 which slopes toward the fabric belt 154 of the transfer conveyor C. The belt 154 advances the fruit through lanes 240 or 242 into one or the other of the discharge chutes 244, depending upon which one of the diverter blades 190 or 202 is at its innermost position. It should again be noted that the fruit are advanced on the belt 154 at a speed more rapid than the speed with which the elevator A conveys the fruit so that there is no tendency for the fruit to pile up in layers on the initial portion of the transfer conveyor belt 154. At this time both the elevator conveyor A and the transfer conveyor C are operating in their high speed ranges.

The fruit rolls gently into the box E at the discharge end of the chute, with no tendency toward excessive rolling and tumbling which might damage fruit already in the box, or damage the fruit being dropped, due to the rubber flap 248 which extends over the end of the chute into the box and which slows and cushions the moving fruit.

As the box E continues to be filled at high speed, the increasing weight of the fruit progressively overcomes the spring counterbalance force and the box gradually lowers so that the fruit drops the least possible distance into the box. Meanwhile, the rubber flaps 260 enclosing the box prevent fruit from rolling out.

When a preselected number of fruit have been discharged into a box, a contact 422 of the counter 420 is momentarily closed and a relay coil 424 is energized from lines 412 and 414 through normally closed relay contacts 426 of a timing relay 428. The coil 424, upon being energized, closes a pair of holding contacts 430 which are connected to line 412 and bypass the counter 420 to keep the coil 424 energized after the counter contacts 422 open.

Energization of coil 424 also closes contacts 432 and 434 thereof, which are respectively connected in series with the timing relay 428 and with a control relay 440 that has contacts 442 in series connection to the motor M. At the same time the contacts 442 close to switch the motor M to slow speed operation at one third of its normal speed, the timing relay 428 is energized through contacts 432.

The slow speed operation of the motor M lasts for approximately two seconds which is sufficient time for the fruit that was discharged onto the belt 154 at the time the timer coil 428 was energized after the contact 422 of the counter 420 closed, to be deposited in the box E. As soon as the belt 154 is clear of fruit in the area between the two diverter blades, or in other words at the end of the two second slow speed operation of the motor M and the belt 154, a contact 444 of the timer coil 428 is closed. Closure of the contacts 444 completes an electrical path from line 412 to energize a relay coil 446 which is connected to the line 414 and to contacts 444 through the closed diverter blade switch 220.

Contacts 448 of the relay coil 446 thus close and energize the diverter blade solenoid 204. The solenoid 204 thus actuates the diverter blade 190 to swing it to the outermost, or straight-ahead position. Because the diverter blade 190 is ganged to the diverter blade 202, blade 202 is moved to the inner position. The next counted batch of fruit is therefore channeled to the empty one of the boxes E while the operator removes the filled box and then places an empty one on the same box carrier.

At the time relay coil 446 is energized, a holding contact 450 associated therewith is closed to maintain energization of the relay coil 446 through a line 452 because the switch 220 is opened immediately when the diverter blades are actuated. Also, when the solenoid 204 is energized, normally closed contacts 453 of coil 446 are opened to isolate the diverter solenoid 206. Meanwhile, the diverter blade 190 in moving to the straight-ahead position has closed the switch 220. Therefore, when the contacts 444 of the timer coil 446 are closed during the next counting sequence, the circuit is already conditioned to energize a relay coil 454 through switch 220 and a line 455. Contacts 456 of the coil 454 will then open and electrically isolate relay coil 446. At the same time, the diverter blade solenoid 206 is energized through the normally closed contacts 453 of relay 446, and the diverter blade 202 is returned to the straight ahead position.

The described two speed operation of the fruit packing machine 10 provides an uninterrupted series of counting and packing operations whereby the operator is completely free of duties other than removing the filled boxes and replacing them with empty ones. In actual practice the machine is capable of sustained operation at the rate of filling five lug boxes per minute, thus allowing the operator twelve seconds to change boxes while the machine is filling one box.

While a particular embodiment of the present invention has been shown and described, it will be understood that the fruit packing machine is capable of modification and variation without departing from the principles of the invention, and that the invention is limited only by the scope and proper interpretation of the appended claims.

The invention having thus been described, that which is believed to be new, and for which protection by Letters Patent is desired, is:

1. A fruit handling machine comprising fruit input means for advancing a single file lane of fruit, sensing means mounted over said lane for contacting fruit and arranged to transmit an electrical impulse for each contacted fruit, totalizing means connected to said sensing means for counting the fruit, transfer means adapted to receive and convey the counted fruit from said input means at an increased rate of speed, drive means for continuously driving said input means and said transfer means at the same relative speed and in either of two speed ranges, container holding means for positioning a box to receive the counted fruit, and control means governed by said totalizing means and connected to said drive means for effecting the change from one of said speed ranges to the other.

2. A fruit handling machine comprising fruit input means for advancing a single file lane of fruit, fruit sensing means mounted over said lane and arranged to transmit an electrical impulse for each fruit, totalizing means connected to said sensing means for counting the fruit, transfer means adapted to receive and convey the counted fruit from said input means at an increased rate of speed, drive means for continuously driving said input means and said transfer means at the same relative speed and in either of two speed ranges, container holding means for positioning a box to receive the counted fruit, control means governed by said totalizing means and connected to said drive means for effecting the lower speed drive at the completion of one fruit count cycle and for effecting the high speed drive during the succeeding fruit count cycle.

3. A fruit handling machine comprising fruit input means for advancing a single file lane of fruit, fruit sensing means mounted over said lane and arranged to transmit an electrical impulse for each fruit, totalizing means connected to said sensing means for counting the fruit, transfer means adapted to receive and convey the counted fruit from said input means at an increased rate of speed, drive means for continuously driving said input means and said transfer means at the same relative speed and in either of two speed ranges, container holding means for positioning a box to receive the counted fruit, and diverting means adjacent said transfer means and controlled by said totalizing means for directing counted fruit toward or away from a box on said container holding means.

4. A fruit handling machine for counting and packing a predetermined number of fruit into a container comprising a continuously driven input conveyor for advancing fruit in parallel lanes, means for individually counting the fruit in each lane at a counting station of said input conveyor, counting means for tallying all of the fruit conveyed through said counting station, a fruit transfer conveyor located adjacent the discharge end of said input conveyor and arranged to receive the counted fruit and convey them at an accelerated speed, fruit diverting means mounted over the conveying flight of said transfer conveyor and operable to channel each counted batch of fruit alternately to one side or the other of said transfer conveyor, fruit guide means mounted at each side of the discharge end of said transfer conveyor and arranged to receive each counted batch of fruit discharged from said transfer conveyor, a container carrier mounted adjacent the discharge end of each of said fruit guide means, power means for continuously driving both of said conveyors at a high speed during fruit counting and at a lower speed during a part of said fruit transfer, and control means for changing said conveyor speeds in response to said counting means.

5. In a fruit counting and packing machine, the combination comprising a continuously driven elevating conveyor for advancing fruit in single file lanes, a bank of counting switches mounted over said elevating conveyor with a switch mounted over each lane and arranged to be actuated by each fruit conveyed past said switch, counting means for totaling the fruit counted by all of said counting switches, a continuously driven transfer conveyor for receiving the counted fruit discharged from said elevating conveyor and advancing the fruit at an increased rate of speed, a pair of pivotally mounted fruit diverting blades arranged to channel all of the fruit in each counted batch alternately into one or the other of two lanes on said transfer conveyor, power means for pivoting said diverter blades, control means associated with said counting means for reducing the speed of both of said conveyors and for actuating said diverter blades when the last counted fruit in each counted batch is advanced by said transfer conveyor to a downstream position beyond said blades, and power actuating means governed by said control means for swinging said diverter blades in order to channel the next counted batch of fruit into the other one of said lanes.

6. A fruit counting and packing machine comprising a continuously driven input conveyor for advancing fruit in parallel lanes and transversely aligned rows, a counting switch mounted over each of said lanes at a counting station of said conveyor and arranged to be actuated by each fruit conveyed past the switch, said switches being arranged in staggered array longitudinally of said input conveyor for separating the counting impulses, counting means for totalizing impulses effected by the fruit conveyed through said counting station, a continuously driven fruit transfer conveyor for receiving counted fruit discharged from said input conveyor and arranged to convey the fruit at a higher speed, fruit diverting means mounted adjacent the conveying flight of said transfer conveyor and arranged to channel all the fruit in each counted batch of fruit into one of two adjacent lanes at the discharge end of said transfer conveyor, fruit guide means aligned with each lane of said transfer conveyor at its discharge end, a box carrier for supporting a box in alignment with each of said fruit guide means, means for continuously driving said first conveyor and said transfer conveyor at a high speed during fruit counting and at a low speed commencing with the last fruit in any one counted batch of fruit, and means for effecting said conveyor speed changes in response to said counting means.

7. In a fruit handling machine, an elevator conveyor comprising a pair of spaced, upwardly inclined driven endless roller chains, an endless series of transverse conveying flights secured at both ends to said chains, said flights having notches therein and having a generally triangular cross section and a leading longitudinal wall inclined downwardly from the horizontal in the direction of chain travel, and a plurality of spaced upstanding resilient blades mounted in the notches formed in each flight and extending through said leading wall, all of said blades being aligned in rows in the direction of chain travel.

8. A fruit handling machine comprising a pair of horizontally spaced and upwardly inclined endless roller chains, a series of elongate conveying flights of triangular transverse cross section mounted on and extending across said chains, the longitudinal walls of adjacent flights diverging outwardly from said chain and defining leading and trailing fruit pocket walls, a plurality of longitudinally aligned upstanding blades mounted in notches in said flights and defining side walls of said fruit receiving pockets formed between adjacent flights, said pockets being aligned in longitudinal conveying lanes, an electrical switch mounted over each lane of pockets and arranged to be actuated by each fruit conveyed in that lane, counting means connected to said switches for totaling all of the switch actuations, an endless belt conveyor arranged to receive the counted fruit discharged from said conveying flights and convey the fruit at an increased rate of speed, a pair of ganged and pivotally mounted diverter blades adjacent the conveying flight of said endless belt for channeling fruit into one or the other of two discharge lanes, a control circuit governed by said counting means and including power means for pivoting said blades in response to said counting means, and power means for driving said chains and said belt at the same relative speed and in either of two speed ranges, said control circuit sequentially effecting the low speed operation of said chain and said belt at the end of one counting cycle, moving the diverter blades to channel fruit of the next counting cycle to the other of said discharge lanes, and causing the high speed operation of said chains and said belt to resume.

9. A fruit handling machine comprising fruit input means for advancing a single file lane of fruit, sensing means mounted over said lane for contacting fruit and arranged to transmit an electrical impulse for each contacted fruit, totalizing means connected to said sensing means for counting the fruit, transfer means adapted to receive and convey the counted fruit from said input means at an increased rate of speed, drive means for continuously driving said input means and said transfer means at the same relative speed and in either of two speed ranges, and control means governed by said totalizing means and connected to said drive means for effecting the change from one of said speed ranges to the other.

10. A fruit handling machine comprising a continuously driven input conveyor for advancing fruit in parallel lanes at a predetermined speed, means for individually counting the fruit in each lane at a counting station of said input conveyor, means for tallying all of the fruit conveyed through said counting station, a continuously driven fruit transfer conveyor arranged to receive the counted fruit discharged from said input conveyor and convey the fruit at a speed greater than said predetermined speed, fruit diverting means mounted over the conveying flight of said transfer conveyor and controlled by said counting means to channel all the fruit in each counted batch alternately to one side or the other of said transfer conveyor.

11. A fruit handling machine comprising a feed conveyor for advancing articles at a predetermined speed, means for counting articles advanced on said feed conveyor, a transfer conveyor having an inlet end adapted to receive articles discharged from said feed conveyor and arranged to advance articles at a speed greater than said predetermined speed, a diverter mechanism mounted for movement across the conveying surface of said transfer conveyor between two positions, said diverter mechanism being effective in each position to direct the articles along a different path, and means responsive to said counting means and effective when a predetermined count has been reached to reduce the speed of said feed conveyor and subsequently actuate said diverter mechanism whereby said diverter mechanism is actuated while articles are fed at a relatively slow speed to said transfer conveyor.

12. A fruit handling machine comprising a conveyor for advancing a plurality of articles at a predetermined speed, a diverter mechanism movable across the space above said conveyor between two positions for directing articles along two different paths, means for selectively moving said diverter mechanism to either of said two positions, counting means for counting the articles advanced by said conveyor, and means responsive to said counting means and effective when a predetermined count is reached for decreasing the speed of said conveyor and subsequently actuating said diverter mechanism whereby said diverter mechanism will be actuated while said conveyor is advancing articles at relatively slow speed.

References Cited by the Examiner
UNITED STATES PATENTS

| | | | |
|---|---|---|---|
| 973,658 | 10/10 | Hochgurtel | 53—78 |
| 1,176,272 | 3/16 | Bultman | 248—281 |
| 1,522,128 | 1/25 | Johnson | 248—281 |
| 2,821,828 | 2/58 | Kernen | 53—245 |
| 2,953,881 | 9/60 | Ellison | 53—78 |

FRANK E. BAILEY, *Primary Examiner.*

ROBERT A. LEIGHEY, *Examiner.*